United States Patent
Müller et al.

(10) Patent No.: US 6,743,515 B1
(45) Date of Patent: Jun. 1, 2004

(54) SELF-ADHESIVE ADDITION-CROSSLINKING SILICONE COMPOSITIONS

(75) Inventors: Philipp Müller, Burghausen (DE); Frank Achenbach, Simbach (DE); Georg Eberl, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 359 days.

(21) Appl. No.: 09/687,824

(22) Filed: Oct. 13, 2000

(30) Foreign Application Priority Data

Dec. 9, 1999 (DE) .......................... 199 59 412

(51) Int. Cl.⁷ .............................. B32B 25/20
(52) U.S. Cl. .................... 428/447; 528/35; 528/31; 528/32; 528/43; 528/12; 528/36; 427/387
(58) Field of Search .............. 528/35, 31, 32, 528/43, 12, 36; 427/387; 428/447

(56) References Cited

U.S. PATENT DOCUMENTS

| | | |
|---|---|---|
| 4,203,913 A | 5/1980 | Burkhardt et al. |
| 5,051,467 A | 9/1991 | Okinoshima et al. |
| 5,364,921 A | 11/1994 | Gray et al. |
| 5,536,803 A * | 7/1996 | Fujiki et al. |
| 2001/0011117 A1 | 8/2001 | Pesch et al. |

FOREIGN PATENT DOCUMENTS

| | | |
|---|---|---|
| DE | 39 39 176 A1 | 5/1990 |
| EP | 0 245 948 A2 | 11/1987 |
| EP | 0 350 951 A2 | 1/1990 |
| EP | 0 497 349 A2 | 8/1992 |
| EP | 0 543 401 A1 | 5/1993 |
| EP | 0 686 671 A2 | 12/1995 |
| EP | 0 875 536 A2 | 11/1998 |

OTHER PUBLICATIONS

European Search Report—Mailed Oct. 25, 2001.
Derwent Abstract Corresponding To EP 0 875 536 A (AN 1998–559408).

* cited by examiner

Primary Examiner—Kuo-Liang Peng
(74) Attorney, Agent, or Firm—Brooks Kushman P.C.

(57) ABSTRACT

The invention relates to self-adhesive addition-crosslinking silicone compositions which comprises (A) diorganopolysiloxanes, (B) organohydrogenpolysiloxanes containing less than 20 SiH bonded hydrogen atoms and less than 12% aryl groups, (C) organosilicon compounds having epoxy groups and hydrolyzable groups and (D) a hydrosilylation catalyst. The compositions are transparent to translucent, exhibit good compositional comparability, and cure to form strongly adhesive elastomers with good physical properties.

9 Claims, No Drawings

SELF-ADHESIVE ADDITION-CROSSLINKING SILICONE COMPOSITIONS

TECHNICAL FIELD

The invention relates to self-adhesive addition-crosslinking silicone compositions and addition-crosslinked silicone elastomers and composite materials prepared therefrom.

BACKGROUND ART

It is known that the adhesion of addition-crosslinked silicone elastomers to numerous substrates, such as plastics, metals and glasses, is poor, i.e. if an addition-crosslinking silicone elastomer material is applied to a substrate and then crosslinked, the silicone elastomer formed can, as a rule, be peeled away from the substrate surface without problems. Only small tensile forces; frequently, even spontaneous delamination of the silicone elastomer from the substrate is found. However, since strong and permanent adhesion of the silicone elastomer to the substrate is of primary importance in numerous applications, a large number of special measures have been proposed for achieving a strong bond between substrate and silicone elastomer.

In principle, the adhesive strength of the silicone elastomer/substrate composite can be increased by suitably changing the chemical and/or physical characteristics of the substrate or its surface prior to application of the addition-crosslinking silicone elastomer composition. This can be effected, for example, by pretreating the substrate surface with adhesion-promoting additives (so-called primers), by subjecting the substrate surface to a plasma treatment, by formulating the substrate to contain special additives, by selectively adjusting the morphology of the substrate, by increasing the surface roughness, etc. These measures have, inter alia, the disadvantage that additional process steps are required. As the characteristics of the substrate often have to meet special requirements, use of these methods of increasing adhesive strength is often not possible.

The adhesive strength of the silicone elastomer/substrate composite can also be increased by selectively changing the chemical and/or physical characteristics of the addition-crosslinking silicone elastomer material. Numerous adhesion-promoting additives are known which, when mixed with the uncrosslinked silicone material, give rise to self-adhesion of the resulting silicone elastomer to various substrates. These include compounds which contain highly reactive functional groups, such as alkoxy, epoxy, carboxyl, amino, etc., these groups generally being chosen so that the adhesion promoter is capable of reacting both with the substrate and with a silicone elastomer component. Although such adhesion promoters may make it possible to dispense with a pretreatment of the substrate, the adhesive strength achieved frequently does not meet the desired requirements. In addition, an increase in the adhesive strength by means of higher content of these adhesion promoters is limited, since the highly reactive groups contained exhibit increasingly disadvantageous effects on performance characteristics such as shelf-life, crosslinking characteristics (inhibition), toxicological safety, etc. For these reasons, interest focused on keeping the content of adhesion promoters as low as possible.

EP-A-686 671 describes a self-adhesive adhesion-crosslinking material which employs no special adhesion promoter, because the adhesion-promoting component is either an organohydrogenpolysiloxane which has on average at least two SiH groups per molecule and whose monovalent Si-bonded radicals comprise at least 12 mol % of hydrocarbon radicals having an aromatic ring; or is a compound which has on average at least one SiH group per molecule and contains a group consisting of two aromatic rings, the two aromatic rings being separated from one another by $-R^{13}R^{14}Si-$, $-R^{13}R^{14}SiO-$, $-OR^{13}R^{14}SiO-$ or $-R^{13}R^{14}SiOR^{13}R^{14}Si-$, the radicals $R^{13}$ and $R^{14}$ being monovalent hydrocarbon radicals. The adhesion-promoting component can thus simultaneously function as the crosslinking agent of the silicone elastomer material. Good adhesion to organic plastics (especially ABS) is achieved with this composition, while at the same time the cured or partially cured products exhibit good demoldability from the metallic vulcanization mold (chromium- or nickel-coated steel mold or mold of an aluminum alloy). The high content of greater than 12 mol % of radicals containing aromatic rings in the SiH-containing, adhesion-promoting component results, however, in considerable incompatibility with the other components of the addition-crosslinking silicone elastomer material. This leads to partial separation (exudation) during storage, necessitating repeated homogenization of the ingredient containing this component before use. This incompatibility, which is already evident from a milky turbidity of the uncrosslinked material, also manifests itself in substantially reduced transparency of the silicone elastomer parts produced therefrom. If the adhesion-promoting component simultaneously acts as a crosslinking agent of the silicone elastomer composition, the incompatibility leads to vulcanization problems, which result in inhomogeneous network formation and poor mechanical vulcanization properties. To overcome these vulcanization problems, it is necessary, in addition to the adhesion-promoting SiH-containing component, to use an SiH-containing crosslinking agent completely compatible with the silicone elastomer material, which however results in other disadvantages, for example higher values of the compression set, and higher tendency to exudation of the adhesion-promoting component. The high content of greater than 12 mol % of radicals containing aromatic rings in the SiH-containing, adhesion-promoting component also results in a considerable structural viscosity and thixotropy of the silicone elastomer material, which is undesired in numerous applications, for example, injection molding of liquid silicone rubber. Finally, the adhesion of this composition to metals is also insufficient.

EP-A-875 536 describes a self-adhesive adhesion-crosslinking silicone rubber mixture which is distinguished by the fact that
  a) the SiH crosslinking agent contains at least 20 SiH groups, other radicals being aliphatically saturated,
  b) an alkoxysilane and/or alkoxysiloxane having epoxy functional groups is/are present, and
  c) a peroxide is optionally present.

The use of glycidyloxypropyltrimethoxysilane (Glymo) is particularly preferred. The silicone rubber mixture described in EP-A-875 536 is particularly suitable for the production of composite shaped articles which consist of the silicone elastomer and an organic plastic. However, the composition described in EP-A-875 536 has the disadvantage that sufficient adhesive strength can be achieved only with the use of very SiH-rich crosslinking agents having on average at least 20 SiH groups per molecule. In the examples there, crosslinking agents having 30 SiH groups per molecule are used. The use of such polyfunctional crosslinking agents considerably reduces the shelf-life of addition-crosslinking silicone rubber mixtures, i.e. the flowability is considerably impaired, which may lead to stiffening of the material. As a result, proper processing of the material, for example by injection molding, is no longer possible. In addition, in order to achieve high adhesive strength, it is necessary to use relatively large amounts of alkoxysilane/alkoxysiloxane having epoxy functional groups, with the result that the crosslinking rate is considerably reduced. Although this can be partly compensated by using a peroxide, as described in EP-A-875 536, only peroxides having a low initiation temperature, such as the 2,4-dichlorobenzoyl peroxide described, are suitable for this purpose, due to the necessarily low crosslinking temperature (softening of the organic plastic). These peroxides on the one hand are toxicologically very unsafe owing to the cleavage products and secondary products liberated (PCB problem) and on the other hand further impair the shelf-life of the material.

In summary, it may be said that none of the conventional addition-crosslinking silicone elastomer compositions satisfactorily meet the requirements set for a self-adhesive silicone elastomer material which is to be used in particular for the production of composite shaped articles or for casting electric/electronic parts, namely:

a) good flowability and shelf-life, b) high crosslinking rate at relatively low temperatures, c) high adhesive strength on organic plastics, metals and glasses, d) easy demoldability from vulcanization molds, e) toxicological safety, f) high level of performance characteristics, especially (transparency, noncorrosiveness, and good mechanical property profile.

DISCLOSURE OF INVENTION

It was therefore an object of the present invention to provide an addition-crosslinking silicone elastomer material which has good self-adhesion to organic plastics, metals and glasses, does not have the above disadvantages, and meets the desired requirements as previously discussed.

BEST MODE FOR CARRYING OUT THE INVENTION

The invention relates to self-adhesive addition-crosslinking silicone compositions which comprise (A) diorganopolysiloxane(s) of the general formula (1)

$$R^1_a R^2_b SiO_{(4-2-b)/2} \quad (1)$$

in which $R^1$ is a hydroxyl radical or a monovalent, optionally halogen-substituted hydrocarbon radical optionally containing O, N, S or P atoms, having 1 to 20 carbon atoms, and being free of aliphatically unsaturated groups, $R^2$ is a monovalent, aliphatically unsaturated, optionally halogen-substituted hydrocarbon radical optionally containing O, N, S or P atoms and having 2 to 10 carbon atoms, b has a value from 0.003 to 2, with the proviso that $1.5 < (a+b) < 3.0$, that on average at least two aliphatically unsaturated radicals $R^2$ are present per molecule and that the viscosity of the diorganopolysiloxane(s) (A), determined at 25° C., is 1 mPa·s to 40,000. Pa·s, (B) organohydrogenpolysiloxane(s) of the general formula (2)

in which $R^3$ is a monovalent aliphatically saturated hydrocarbon radical having 1 to 20 carbon atoms, $R^4$ is (a) an optionally halogen-substituted monovalent hydrocarbon radical having 6 to 15 carbon atoms which contains at least one aromatic $C_6$-ring, and/or (b) a halogen-substituted, saturated monovalent hydrocarbon radical optionally containing O, N, S or P atoms and having 2 to 20 carbon atoms, $R^5$ is a bivalent, optionally halogen-substituted hydrocarbon radical Si-bonded at both ends, optionally containing O, N, S or P atoms and having 6 to 20 carbon atoms, and c, d, e and f denote positive numbers, with the proviso that the organohydrogenpolysiloxane (B) contains on average 3 to less than 20 SiH groups per molecule, that the relationship: $0.05 < 100 \ (d+e)/(c+d+e+f) < 12$ is fulfilled, and that the viscosity of the organohydrogenpolysiloxane (B), determined at 25° C., is 1 mPa·s to 100 Pa·s, (C) organosilicon compounds having epoxy groups and hydrolyzable groups, of the general formula (3)

and/or their partial hydrolysis products, in which $R^7$ is a hydrogen radical, a hydroxyl radical or an optionally halogen- or cyano-substituted, saturated monovalent hydrocarbon radical optionally containing O, N, S or P atoms and having 1 to 20 carbon atoms, $R^8$ is an optionally halogen-substituted monovalent hydrocarbon radical containing at least one epoxy group, optionally containing O, N, S or P atoms and having 2 to 20 carbon atoms, $R^9$ is a hydrolyzable, monovalent optionally halogen-substituted hydrocarbon radical bonded to Si via an SiC—, Si—O—N— or Si—N— link, optionally containing O, N, S or P atoms and having 1 to 20 carbon atoms, with the proviso that $4 > g \geq 0$, $4 > h > 0$, $4 > i > 0$, $4 \geq (h+i) > 0$ and $4 \geq (g+h+i)$, and (D) a hydrosilylation catalyst.

Organohydrogenpolysiloxane (B) acts as an adhesion promoter and simultaneously as a crosslinking agent.

The advantageous properties of the silicone compositions derive from in the fact that the self-adhesion is achieved by a component present in every addition-crosslinking material, namely the SiH-containing crosslinking agent (B), in combination with the organosilicon compound (C) having epoxy-functional and hydrolyzable radicals, it merely being necessary for the SiH crosslinking agent (B) to contain a few groups which reduce the compatibility with the other components of the material (especially with the diorganopolysiloxane). These groups are not reactive functional groups, but are preferably phenyl groups, with the result that the toxicological safety of the material (e.g. drinking water approval; BGA/FDA approval) is preserved, no vulcanization problems occur, the shelf-life is sufficient, the transparency of the crosslinked silicone elastomer is maintained, and no components which exude or are extractable are added. The combination of the SiH crosslinking agent (B) having reduced compatibility, with an organosilicon compound (C) having epoxy-functional and hydrolyzable radicals, makes it possible, first, to keep the content of incompatible groups in the SiH crosslinking agent low, and secondly, to achieve the adhesion-promoting activity of the organosilicon compound (C) having epoxy-functional and hydrolyzable radicals even in the case of relatively low SiH functionality of the SiH crosslinking agent. Only the combination of the two components (B) and (C) leads to synergistic self-adhesion effects of these two components.

In particular, the present composition is distinguished by the fact that a) the crosslinking rate is scarcely reduced, b) the transparency of the crosslinked silicone elastomers is not impaired, c) there is no need to accept any disadvantageous changes in the mechanical elastomer properties, d) the adhesion-promoting component (B) simultaneously acts as a crosslinking agent (no additional SiH crosslinking agent required), e) strong self-adhesion can be achieved even on metals without hindering the demoldability from metal vulcanization molds (it was found that the adhesion to metal shortly after crosslinking permits demolding of the silicone elastomer part; if, however, the silicone elastomer/metal composite is stored, the silicone elastomer grows strongly and permanently onto the metal surface within a short time), f) the flowability of the uncrosslinked material is scarcely impaired.

Although the adhesion-promoting component (B) of the present invention also has reduced compatibility with the other components of the material, which is evident from turbidity on mixing in, this turbidity disappears completely as soon as the material is heated for the purpose of crosslinking; this indicates a homogeneous distribution of the molecules of the crosslinking agent in the material at the time of crosslinking. If, on the other hand, the adhesion-promoting SiH-containing component (B) contains phenyl groups 12 mol % or more of the radicals, turbidity also persists at customary crosslinking temperatures and indicates inhomogeneous network formation, which can also be demonstrated on the basis of the optical properties, crosslinking characteristics, and on the basis of the mechanical properties.

The components (A), (B) and (C) may each constitute a single compound or a mixture of different compounds.

Examples of the radicals $R^1$ are alkyl radicals such as the methyl, ethyl, propyl, isopropyl, tert-butyl, n-pentyl, isopentyl, neopentyl, tert-pentyl, n-octyl, 2-ethylhexyl, 2,2,4-trimethylpentyl, n-nonyl, and octadecyl radicals; cycloalkyl radicals such as the cyclopentyl, cyclohexyl, cycloheptyl, norbornyl, adamantylethyl and bornyl radicals; aryl or aralkyl radicals such as the phenyl, ethylphenyl, tolyl, xylyl, mesityl, and naphthyl radicals; aralkyl radicals such as the benzyl, 2-phenylpropyl and phenylethyl radicals; and those derivatives of the above radicals which are halogenated and functionalized with organic groups, such as the 3,3,3-trifluoropropyl, 3-iodopropyl, 3-isocyanatopropyl, aminopropyl, methacryloyloxyrmethyl, and cyanoethyl radicals. Preferred radicals $R^1$ contain 1 to 10 carbon atoms and optionally contain halogen substituents. Particularly preferred radicals $R^1$ are the methyl, phenyl and 3,3,3-trifluoropropyl radicals, in particular the methyl radical.

The radicals $R^2$ are obtainable by a hydrosilylation reaction. Examples of these are alkenyl and alkynyl radicals such as the vinyl, allyl, isopropenyl, 3-butenyl, 2,4-pentadienyl, butadienyl, 5-hexenyl, undecenyl, ethynyl, propynyl and hexynyl radicals; cycloalkenyl radicals such as the cyclopentenyl, cyclohexenyl, 3-cyclohexenylethyl, 5-bicycloheptenyl norbornenyl, 4-cyclooctenyl, and cyclooctadienyl radicals; aralkenyl radicals such as the styryl and styrylethyl radicals; and those derivatives of the above radicals which are halogenated and/or contain heteroatoms, such as the 2-bromovinyl, 3-bromo-1-propynyl, 1-chloro-2-methylallyl, 2-(chloromethyl)allyl, styryloxy, allyloxypropyl, 1-methoxyvinyl, cyclopentenyloxy, 3-cyclohexenyloxy, acryloyl, acryloyloxy, methacryloyl, and methacryloyloxy radicals. Preferred radicals $R^2$ are the vinyl, allyl and 5-hexenyl radicals, in particular the vinyl radical.

In the case of the diorganopolysiloxanes (A) of the general formula (1), the viscosity determined at 25° C. is preferably 100 mPa·s to 30,000 Pa·s. More preferably, the viscosity range is from 1 to 30,000 Pa·s. Depending on the type of addition-crosslinking material, different viscosity ranges may be preferred. Viscosities from 100 to 10,000 mPa·s are particularly preferred for the materials known as RTV-2 (room temperature vulcanizing) compositions, from 1 to 100 Pa·s for LSR (liquid silicone rubber) compositions, and from 2000 to 40,000 Pa·s for HTV (high temperature vulcanizing) compositions.

Examples of $R^3$ are alkyl radicals such as the methyl, ethyl, propyl, isopropyl, tert-butyl, n-octyl, 2-ethylhexyl and octadecyl radicals; and cycloalkyl radicals such as the cyclopentyl, cyclohexyl, norbornyl, and bornyl radicals. Preferred radicals $R^3$ are hydrocarbon radicals having 1 to 10 carbon atoms. A particularly preferred radical $R^3$ is the methyl radical.

Examples of $R^4$ (a) are the phenyl, tolyl, xylyl, biphenylyl, anthryl, indenyl, phenanthryl, naphthyl, benzyl, phenylethyl and phenylpropyl radicals, and those derivatives of the above radicals which are halogenated and functionalized with organic groups, such as the o-, m- or p-chlorophenyl, pentafluorophenyl, bromotolyl, trifluorotolyl, phenoxy, benzyloxy, benzyloxyethyl, benzoyl, benzol-oxy, p-tert-butylphenoxypropyl, 4-nitrophenyl, quinolinyl, and pentafluorobenzoyloxy radicals.

Examples of hydrocarbon radicals $R^4$ (b) having 2 to 20 carbon atoms are the 3-chloropropyl, 3-bromopropyl, 3,3,3-trifluoropropyl, 2-fluoroethyl, 1,1-dihydroperfluorododecyl, and 2-cyanoethyl radicals. Particularly preferred radicals $R^4$ are the phenyl radical and the 3,3,3-trifluoropropyl radical.

Preferred radicals $R^5$ correspond to the general formula (4)

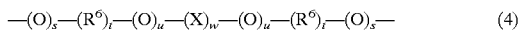   (4)

in which s, t, u and w, independently of one another, denote the values 0, 1 or 2, $R^6$ may be identical or different and denotes a bivalent, optionally halogen-substituted hydrocarbon radical which optionally contains O, N, S or P atoms, is free of aliphatically unsaturated aliphatic groups and contains 1 to 10 carbon atoms, such as —$CH_2$—, —$CH_2$—$CH_2$—, —$CH_2$—$CH_2$—$CH_2$—, —$CF_2$—, —$CH_2$—$CF_2$—, —$CH_2$—$CH(CH_3)$—, —$C(CH_3)_2$—, —$CH_2$—$C(CH_3)_2$—, —$C(CH_3)_2$—$CH_2$—, $CH_2$—$CH_2$—O— or —$CF_2$—$CF_2$—O—, —(X)— denotes a bivalent radical which may be —Ph—, —Ph—O—Ph—, —Ph—S—Ph—, —Ph—$SO_2$—Ph—, —Ph—$C(CH_3)_2$—Ph—, —Ph—$C(CF_3)_2$—Ph—, —Ph—C(O)—Ph—, cyclohexylene or norbornylene, —Ph— designating a phenylene group. A particularly preferred radical $R^5$ is the phenylene radical.

The organohydrogenpolysiloxane (B) preferably contains 5 to 18 SiH groups per molecule. The viscosity of the component (B), measured at 25° C., is preferably 2 mPa·s to 1 Pa·s. Owing to the labile nature of the SiH group, the component (B) may have a low content, typically <100 ppm by weight, of Si-bonded OH groups, due to the method of preparation.

Examples of hydrocarbon radicals $R^7$ are alkyl radicals such as the methyl, ethyl, n-propyl, isopropyl, tert-butyl, n-pentyl, isopentyl, neopentyl, tert-pentyl, n-octyl, 2-ethylhexyl, 2,2,4-trimethylpentyl, n-nonyl and octadecyl radicals; cycloalkyl radicals such as the cyclopentyl, cyclohexyl, cycloheptyl, norbornyl, adamantylethyl, and bornyl radicals; aryl radicals such as the phenyl, ethylphenyl, tolyl, xylyl, mesityl, and naphthyl radicals; aralkyl radicals such as the benzyl, phenylethyl, and phenylpropyl radicals; alkenyl or alkynyl radicals such as the vinyl, allyl, isopropenyl, 3-butenyl, 2,4-pentadienyl, butadienyl, 5-hexenyl, undecenyl, ethynyl, propynyl and hexynyl radicals; cycloalkenyl radicals such as the cyclopentenyl, cyclohexenyl, 3-cyclohexenylethyl, 5-bicycloheptenyl, norbornenyl, 4-cyclooctenyl, and cyclooctadienyl radicals; aralkenyl radicals such as the phenylethenyl and phenylethynyl radical; and those derivatives of the above radicals which are halogen-substituted or contain heteroatoms, such as the 3-chloropropyl, 3-bromopropyl, decafluoro-1,1,2,2-tetrahydrooctyl, (p-chloromethyl)phenyl, (p-chloromethyl)phenethyl, hydroxymethyl, hydroxyethyl, hydroxypropyl, hydroxybutyl, 2-bromovinyl, 2-allyloxymethyl, acetyl, acetoxymethyl, acetoxyethyl, acetoxypropyl, 3-phenoxypropyl, benzoyloxypropyl, mercaptopropyl, cyanoethyl, cyanopropyl, 3-cyanobutyl, 3-isocyanatopropyl, 2-(carbomethoxy)ethyl, 10-(carbomethoxy)decyl, 2-(carboxymethylthio)ethyl, 3-carboxypropyl, aminomethyl, aminoethyl, aminopropyl, aminohexyl, aminoethylaminopropyl, 3-N-allylamino)propyl, (aminoethylaminomethyl)phenethyl, m-aminophenyl, 3-(m-aminophenoxy)propyl, 3-acryloyloxypropyl, 3-acryloyloxy-2-hydroxypropyl, 4-(acryloyloxymethyl)phenethyl, methacryloyloxymethyl, methacryloyloxyethyl, and methacryloyloxypropyl radicals. Preferred radicals $R^7$ are the methyl, ethyl, propyl, butyl, octyl, vinyl, allyl, phenyl, 3,3,3-trifluoropropyl and cyanopropyl radicals. Particularly preferred radicals $R^7$ are the methyl, vinyl and phenyl radicals.

Examples of the radicals $R^8$ are the epoxyethyl, 2,3-epoxypropyl, 3,4-epoxybutyl, 5,6-epoxyhexyl, 9,10-epoxydecyl, glycidyloxy, 3-glycidyloxypropyl, glycidyloxyisobutyl, 2-methylglycidyloxypropyl, 3-phenylglycidyloxypropyl, glycidyloxyphenylnonyl, glycidyloxybenzylethyl, 3,4-epoxycyclohexyl, 2-(3,4-epoxycyclohexyl)ethyl, 3-(3,4-epoxycyclohexyl)propyl, 1,4-epoxycyclohexyl, and 2-(1,4-epoxycyclohexyl)ethyl radicals. Preferred radicals $R^8$ are the 3,4-epoxycyclohexyl, 3-(3,4-epoxycyclohexyl)propyl and glycidyloxypropyl radicals. $R^8$ preferably has 2 to 10 carbon atoms. A particularly preferred radical $R^8$ is the glycidyloxypropyl radical.

$R^9$ denotes a hydrolyzable, monovalent, optionally halogen-substituted hydrocarbon radical bonded to Si via an Si—O—C—, Si—O—N— or Si—N-link, optionally containing O, N, S or P atoms and having 1 to 20 carbon atoms.

Examples of the radicals $R^9$ are a) alkoxy, alkenoxy or aryloxy groups of the general formula —$OR^{10}$, such as the methoxy, ethoxy, n-propoxy, isopropoxy, n-butoxy, sec-butoxy, tert-butoxy, 2-ethylbutoxy, 2-ethylhexyloxy, vinyloxy, allyloxy, isopropenyloxy, cyclobutenyloxy, cyclohexenyloxy, 1,3-butadienyloxy, propargyloxy, phenoxy, benzyloxy, and m- and p-vinylbenzyloxy radicals;

b) acyloxy groups of the general formula —$OCOR^{10}$, such as the formyloxy, acetoxy, 2-ethylhexanoyloxy, acryloyloxy, methacryloyloxy, benzoyloxy, and norbornyl-acetoxy radicals;

c) amino groups of the general formula —$NH_2$, —$NHR^{10}$, and —$NHR^{10}_2$, such as the dimethylamino, diisopropylamino, allylamino, n-butylamino, sec-butylamino, and cyclohexylamino radical;

d) oxime groups of the general formula —$ON=CH_2$, —$ON=CHR^{10}$, and —$ON=CR^{10}_2$, such as the methyl ethyl ketoxime, methyl isobutyl ketoxime, methyl n-amyl ketoxime, and dimethyl ketoxime radicals;

e) amido groups of the general formula —NH—C(=O)—$R^{10}$ or —$NR^{10}$—C(=O)—$R^{10}$, such as the N-methylbenzamido and N-methylacetamido radicals;

f) aminoxy groups of the general formula —$ONH_2$, —$ONHR^{10}$ or —$ONR^{10}_2$, such as the hydroxylamino radical; and g) those derivatives of the abovementioned radicals which are halogen-substituted or contain heteroatoms or have an otherwise complex composition, such as p-aminophenoxy, 2-methoxyethoxy, 1-methoxy-2-propoxy, 1-methoxy-isopropenyloxy, methoxyethoxyethoxy, 1-methoxy-2-methylpropenyloxy, acryloyloxymethoxy, methacryloyloxy(polyethyleneoxy), furyloxy, and N-vinyl-formamido radicals, and —O—Ph—C(=O)—Ph, —O—C($CF_3$)=CH—C(=O)—$CF_3$, —O—C($CH_3$)=CH—C(=O)—$CH_3$, —O—C($CH_3$)$_2$—CH=$CH_2$, —NH—C(=O)—$CH_3$, —O—C(=O)—$CH_2Br$, —O—C(=O)—$CF_3$, —O—C(=O)—C≡—CH or —O—$CH_2$—C(=O)—O—Si($CH_3$)$_3$, where the radicals $R^{10}$ represent monovalent aliphatic or aromatic, saturated or unsaturated, optionally halogen-substituted hydrocarbon radicals having 1 to 10 carbon atoms. Preferred radicals $R^9$ are the alkoxy radicals such as the methoxy, ethoxy, propoxy, and butoxy radicals. The particularly preferred radical $R^9$ is the methoxy radical. A particularly suitable organosilicon compound (C) is glycidyloxypropyltrimnethoxysilane (Glymo).

The radicals $R^1$ to $R^{10}$ in all above formulae may be identical or different. Preferred heteroatoms are N, O and S. Preferred halogen substituents are F, Cl and Br.

Preferably 0.1 to 50 parts by weight, in particular 0.5 to 10 parts by weight, of organohydrogenpolysiloxane (B) and 0.1 to 10 parts by weight, in particular 0.5 to 5 parts by weight, of organosilicon compound (C) are used per 100 parts by weight of diorganopolysiloxane (A).

Hydrosilylation catalyst (D) serves as a catalyst for the hydrosilylation addition reaction between the aliphatically unsaturated hydrocarbon radicals $R^2$ of the diorganopolysiloxanes (A) and the silicon-bonded hydrogen atoms of the organohydrogenpolysiloxanes (B). Numerous suitable hydrosilylation catalysts are described in the literature. In principle, all hydrosilylation catalysts corresponding to the prior art and used in addition-crosslinking silicone rubber materials can be used.

Metals and their compounds, such as platinum, rhodium, palladium, ruthenium and iridium, preferably platinum, can be used as hydrosilylation catalysts (D). The metals can optionally be fixed on finely divided support materials, such as active carbon, metal oxides, such as alumina, or silica.

Platinum and platinum compounds are preferably used. Particularly preferred platinum compounds are those which are soluble in polyorganosiloxanes. The soluble platinum compounds used may be, for example, the platinum-olefin complexes of the formulae $(PtCl_2.olefin)_2$ and $H(PtCl_3.olefin)$, alkenes having 2 to 8 carbon atoms such as ethylene, propylene, isomers of butene and of octene, and cycloalkenes having 5 to 7 carbon atoms such as cyclopentene, cyclohexene and cycloheptene preferably being used. Further soluble platinum catalysts are the platinum-cyclopropane complexes of the formula $(PtCl_2C_3H_6)_2$, the reaction products of hexachloroplatinic acid with alcohols, ethers and aldehydes and mixtures thereof or the reaction product of hexachloroplatinic acid with methylvinylcyclotetrasiloxane in the presence of sodium bicarbonate in ethanolic solution. Platinum catalysts with phosphorous, sulfur and amine ligands may also be used, e.g. $(Ph_3P)_2PtCl_2$. Complexes of platinum with vinylsiloxanes, such as symdivinyltetramethyldisiloxane, are particularly preferred.

The amount of hydrosilylation catalyst (D) used depends on the desired crosslinking rate and economic points of view. Preferably, $1\times10^{-5}$ to $5\times10^{-2}$ part by weight, in particular $1\times10^{-3}$ to $1\times10^{-2}$ part by weight of platinum catalysts, calculated as platinum metal, is used per 100 parts by weight of diorganopolysiloxanes (A).

The self-adhesive addition-crosslinking silicone compositions can optionally contain conventional further components (E), such as fillers, inhibitors, stabilizers, pigments and catalysts.

In order to achieve a sufficiently high mechanical strength of the crosslinked silicone rubber, it is preferable to incorporate actively reinforcing fillers as component (F) into the addition-crosslinking silicone compositions. The actively reinforcing fillers (F) preferably used are, in particular, precipitated and pyrogenic silicas, and mixtures thereof. The specific surface area of these actively reinforcing fillers should be at least 50 $m^2/g$ or preferably in the range from 100 to 400 $m^2/g$ according to the determination by the BET method. Such actively reinforcing fillers are very well known materials in the area of silicone rubbers.

The compounding of the self-adhesive addition-crosslinking silicone compositions is effected by mixing the abovementioned ingredients in any desired sequence. The crosslinking of the self-adhesive addition-crosslinking silicone compositions is preferably effected by heating, preferably at 30° C. to 250° C., preferably at at least 50° C., in particular at at least 100° C., and preferably at not more than 200° C., more preferably at not more than 180° C.

The invention also relates to the addition-crosslinked silicone elastomers prepared from the crosslinkable compositions.

The silicone compositions can be bonded to a substrate by applying the silicone compositions to the substrate and then crosslinking them, preferably by heating to 30 to 250° C., to give a composite material. The self-adhesive addition-crosslinking silicone composition can advantageously be used in particular where good adhesive strength between the addition-crosslinked silicone elastomer and a substrate, preferably an organic polymer, metal or glass substrate, is desired. The substrate may be present as a shaped article, film or coating. The self-adhesive addition-crosslinking silicone compositions are suitable for the production of composite materials by coating, adhesive bonding or casting, and for the production of shaped articles.

The self-adhesive addition-crosslinking silicone compositions are particularly suitable for casting and for adhesively bonding electrical and electronic parts and for the production of composite shaped articles. Composite shaped articles are understood here as meaning a uniform shaped article comprising a composite material which is composed of a silicone elastomer part produced from the silicone compositions and at least one substrate, so that there is a strong, permanent bond between the two parts. Such a composite shaped article is preferably produced by processing an organic polymer or polymer precursor to give a shaped article, followed by bringing the silicone composition into contact with this shaped article and crosslinking. This can be effected, for example, by injection molding, by means of extrusion, and by the so-called press-molding method. Composite materials and in particular composite shaped articles can be used in a very wide range of applications, for example in the electronics, household appliance, consumables, construction, and automotive industries, in medical technology, in the production of sport and leisure articles, etc.

In the following examples, unless stated otherwise in each case, all pressures are 0.10 MPa (abs.), and all temperatures are 20° C.

EXAMPLES

Substrates

The adhesion of the addition-crosslinked silicone elastomers according to the invention and comparative elastomers not according to the invention was tested on the following substrates:

a) polybutylene terephthalate (PBT): Ultradur® B4300G6 (BASF AG; 30% GF)

b) polyamide 6: Durethan® BKV30 (Bayer AG; 30% GF)

c) polycarbonate (PC): Lexan® (General Electric)

d) aluminum (industrial quality; not primed)

e) steel: VA stainless steel (industrial quality).

Characterization of Adhesion (Examples 1, 2, and 3 and Comparative Examples C1 and C2

To characterize adhesive strength, 100.0 g of an addition-crosslinking liquid silicone elastomer material which is free of crosslinking agent, and contains 71.6% by weight of diorganopolysiloxane having a viscosity of 20,000 mPa·s and 28.4% by weight of a reinforcing filler and is available from Wacker-Chemie GmbH under the name ELASTOSIL® LR 3003/40 A, are thoroughly mixed with a specified amount of the adhesion-promoting additive which is prepared according to the following examples and which simultaneously serves as a crosslinking agent, and then degassed in vacuo at room temperature. This material is then immediately applied as an about 1.2 mm thick layer, by means of a doctor blade, to the respective substrate surface which has been cleaned beforehand with ethanol. A primed, hollow aluminum article having a contact area of 100 $mm^2$ is then placed on the still uncrosslinked layer of the liquid silicone elastomer material. The priming of the hollow aluminum article guarantees bonding of the crosslinked silicone elastomer to be strong in each case, so that under tensile stress, either a loss of cohesion within the silicone elastomer occurs or a loss of adhesion between silicone elastomer and substrate occurs. By means of a spacer and by slight pressure on the hollow aluminum article, a defined layer thickness of 1 mm is set. The laminate produced in this manner and consisting of substrate, 1 mm thick liquid silicone elastomer material and hollow aluminum article, is then vulcanized at a temperature of 130° C. for 30 min in a forced-circulation drying oven, complete crosslinking of the liquid silicone elastomer material taking place, followed by cooling to room temperature. By means of a tensile tester, the maximum force which is required to separate the hollow aluminum article completely from the substrate, i.e. to break the adhesive bond, is then measured. The maximum value of this force, based on the contact area of 100 $mm^2$, is stated as the breaking tension in $N/mm^2$. Ten laminates are measured per example, the breaking tension is determined as a mean value and the proportion of cohesive failure is determined as a percentage. A cohesive failure of 0% means that the silicone elastomer was detached from the substrate surface completely and without leaving a residue. A cohesive failure of 100% means that the delamination took place exclusively by crack growth within the silicone elastomer.

Example 1

5.0 kg of a methylhydrogenpolysiloxane, $Me_3Si$—(—O—SiH(Me))$_n$—O—SiMe$_3$, which has terminal trimethylsilyloxy groups and, according to $^{29}$Si-NMR, has a number average chain length of n=53, and 5.0 kg of a siloxane copolymer having terminal trimethylsilyloxy groups and consisting of dimethylsilyloxy and methylphenylsilyloxy units in a molar ratio of 15.2:21.8 and having a viscosity, measured at 25° C., of 100 mPa·s, are initially introduced into a stirrer. 1.8 g of phosphonitrilic chloride, prepared according to U.S. Pat. No. 4,203,913, are added at room temperature with continuous stirring. After application of a vacuum of <20 mbar, stirring is carried out for 5 min and the vacuum is then broken with $N_2$. Stirring is then carried out for 2 h at a temperature of 100° C. 14 g of hexamethyldisilazane are then added and stirring is carried out for a further 15 min. Finally, a vacuum of <10 mbar is applied, the mixture is freed from volatile components with continuous stirring for 1 h at 100° C., the vacuum is broken with $N_2$, cooling to room temperature is effected, and the reaction product is filtered. A polyorganosiloxane which has terminal trimethylsilyloxy groups, is composed of —O—Si(Me)$_2$—, —O—SiH(Me)— and —O—Si(Me)Ph— units in a molar ratio of 15.2:63.0:21.8 and has a viscosity of 32.1 $mm^2$/s at 25° C. is obtained. The product contains on average 17 Si—H groups per molecule.

The preparation of the adhesion-promoting additive, which is used in an amount of 1.3 g per 100 g of silicone elastomer material to be crosslinked, is effected by mixing 10 parts by weight of glycidyloxypropyltriiethoxysilane with 16 parts by weight of the reaction product described above. The results of the adhesion measurements are shown in Table 1.

Comparative Example C1

Instead of the phenyl-containing crosslinking agent described in Example 1, a polyorganosiloxane which has terminal trimethylsilyloxy groups, contains only —O—Si(Me)$_2$— and —O—SiH(Me)— units in a molar ratio of 29:71 and has a viscosity of 30 $mm^2$/s at 25° C. is used; this crosslinking agent contains on average 33 Si—H groups per molecule. The preparation of the adhesion-promoting additive, which is used in an amount of 1.05 g per 100 g of silicone elastomer material to be crosslinked, is effected by mixing 10 parts by weight of glycidyloxypropyltrimethoxysilane with 11 parts by weight of the phenyl-free crosslinking agent described above. This mixing ratio and the amount of adhesion-promoting additive used ensure that the addition-crosslinking silicone elastomer materials prepared according to Example 1 and Example 2 have the same content of Si-bonded hydrogen. The results of the adhesion measurements are shown in Table 1.

Example 2

0.05 g of phosphonitrilic chloride, prepared according to U.S. Pat. No. 4,203,913, is added at room temperature with continuous stirring, to 150 g of a methylhydrogenpolysiloxane, $Me_3Si$—(—O—SiH(Me))$_n$—O—SiMe$_3$, which has terminal trimethylsilyloxy groups and, according to $^{29}$Si-NMR, has a number average chain length of n=53, and 150 g of a siloxane copolymer having terminal trimethylsilyloxy groups, consisting of dimethylsilyloxy and diphenylsilyloxy units, having a phenyl content of 19.2% by weight and having a viscosity of 85 mPa·s, measured at 25° C. After application of a vacuum of <20 mbar, stirring is carried out for 5 min and the vacuum is then broken with $N_2$. Stirring is then carried out for 2 h at a temperature of 100° C. 0.5 g of hexamethyldisilazane is added and stirring is carried out for a further 15 min. Finally, a vacuum of <10 mbar is applied, the mixture is freed from volatile components with continuous stirring for 1 h at 100° C., the vacuum is broken with $N_2$, cooling to room temperature is effected and the reaction product is filtered. A polyorganosiloxane which has terminal trimethylsilyloxy groups, is composed of —O—Si(Me)$_2$—, —O—SiH(Me)— and —O—SiPh$_2$— units in a molar ratio of 26.5:70.0:3.5 and has a viscosity of 455 $mm^2$/s at 25° C. is obtained.

The preparation of the adhesion-promoting additive, which is used in an amount of 1.3 g per 100 g of silicone elastomer material to be crosslinked, is effected by mixing 10 parts by weight of glycidyloxypropyltrimethoxysilane with 16 parts by weight of the reaction product described above.

The results of the adhesion measurements are shown in Table 1.

Example 3

150 g of a methylhydrogenpolysiloxane, $Me_3Si$—(—O—SiH(Me))$_n$—O—SiMe$_3$, which has terminal trimethylsilyloxy groups and, according to $^{29}$Si-NMR, has a number average chain length of n=53, 26 g of a polydimethylsiloxane which has terminal trimethylsilyloxy groups and has a viscosity of 100 mPa·s at 25° C., and 112 g of 1,3,5-trimethyl-1,3,5-tris(3,3,3-trifluoropropyl)cyclotrisiloxane are initially introduced at room temperature and mixed, with continuous stirring, with 0.05 g of phosphonitrilic chloride, prepared by U.S. Pat. No. 4,203,913. After application of a vacuum of <20 mbar, stirring is carried out for 5 min and the vacuum is then broken with $N_2$. Stirring is then carried out for 2 h at a temperature of 100° C. In order to deactivate the catalyst (phosphonitrilic chloride), gaseous ammonia is passed in for 15 min. Thereafter, a vacuum of <10 mbar is applied, the mixture is freed from volatile components with continuous stirring for 1 h at 10° C., the vacuum is broken with $N_2$, cooling to room temperature is effected, and the reaction product is filtered. A polyorganosiloxane which has terminal trimethylsilyloxy groups, composed of —O—Si(Me)$_2$—, —O—SiH(Me)— and —O—Si(Me)(CH$_2$CH$_2$CF$_3$)— units in a molar ratio of 10.1:69.9:20.0 and which has a viscosity of 52.3 $mm^2$/s at 25° C. is obtained.

The preparation of the adhesion-promoting additive, which is used in an amount of 1.3 g per 100 g of silicone elastomer material to be crosslinked, is effected by mixing 10 parts by weight of glycidyloxypropyltrimethoxysilane with 16 parts by weight of the reaction product described above. The results of the adhesion measurements are shown in Table 1.

Comparative Example C2

The composition corresponds to the silicone elastomer material described in Example 1, except that no glycidyloxypropyltrimethoxysilane was added. The results of the adhesion measurements are shown in Table 1.

mean value, and the proportion of cohesive failure is determined as a percentage. Cohesive failure of 0% means that the silicone elastomer was detached completely and without residue from the substrate surface. Cohesive failure of 100% means that the delamination took place exclusively by crack growth within the silicone elastomer.

Example 4

The composition corresponds to the addition-crosslinking silicone elastomer material according to the invention

TABLE 1

| | (breaking tension in [N/mm$^2$]; proportion of cohesive failure in [%]) | | | | | | | | |
|---|---|---|---|---|---|---|---|---|---|
| | PBT | | Polyamide 6 | | PC | | Aluminum | | Steel | |
| Ex. | [N/mm$^2$] | [%] | [N/mm$^2$] | [%] | [N/mm$^2$] | [%] | [N/mm$^2$] | [%] | [N/mm$^2$] | [%] |
| 1 | 2.72 | 100 | 3.05 | 50 | 2.38 | 0 | 2.89 | 100 | 2.65 | 100 |
| C1 | 1.60 | 0 | 1.41 | 0 | 1.51 | 0 | 1.90 | 0 | 1.98 | 0 |
| 2 | 2.56 | 100 | 3.12 | 30 | 2.33 | 0 | 3.23 | 100 | 2.55 | 90 |
| 3 | 2.22 | 80 | 2.78 | 40 | 2.08 | 30 | 2.78 | 100 | 2.25 | 90 |
| C2 | 1.20 | 10 | 1.53 | 20 | 1.87 | 0 | 2.20 | 20 | 2.13 | 20 |

The values shown in Table 1 demonstrate the high adhesive strength between the addition-crosslinked silicone elastomer according to the invention (Examples 1, 2, and 3) and various organic plastics and metals. As is evident from Comparative Example C1, high adhesive strength is not achieved by the presence of component (C) alone (e.g. glycidyloxypropyltrimethoxysilane) but only in conjunction with component (B) according to the invention. As is evident from Comparative Example C2, a high adhesive strength is not achieved by the presence of the component (B) alone but only in conjunction with component (C) according to the invention. This is evidence of a synergistic effect of the adhesion-promoting components (B) and (C) of the silicone elastomer material according to the invention.

Characterization of the Adhesion (Examples 4, 5, 6 and Comparative Examples C3 and C4

A substrate strip having dimensions 60×20×2 mm is introduced into a stainless steel compression mold and the mold is filled with the addition-crosslinking silicone elastomer material to be tested. A press cure is carried out for 5 min at a temperature of 170° C. and a pressure of 30 tonnes. After removal of the laminate, the rigid substrate element is firmly clamped and the maximum parting force required to detach the adhering silicone elastomer strip in a peel test is determined. The parting force is determined according to DIN 53531 and is stated in N/mm. Ten laminates are measured per example, the parting force is determined as a described in Example 1. The results of the measurements of the parting force are shown in Table 2.

Example C3

The composition corresponds to the addition-crosslinking silicone elastomer material, not according to the invention, described in Comparative Example C1. The results of the measurements of the parting force are shown in Table 2.

Example 5

The composition corresponds to the addition-crosslinking silicone elastomer material according to the invention described in Example 2. The results of the measurements of the parting force are shown in Table 2.

Example 6

The composition corresponds to the addition-crosslinking silicone elastomer material according to the invention, described in Example 3. The results of the measurements of the parting force are shown in Table 2.

Comparative Example C4

The composition corresponds to the addition-crosslinking silicone elastomer material not according to the invention, described in Comparative Example C2. The results of the measurements of the parting force are shown in Table 2.

TABLE 2

| | (parting force in [N/mm]; proportion of cohesive failure in [%]) | | | | | | | |
|---|---|---|---|---|---|---|---|---|
| | PBT | | Polyamide 6 | | Aluminum | | Steel | |
| Ex. | [N/mm] | [%] | [N/mm] | [%] | [N/mm] | [%] | [N/mm] | [%] |
| 4 | 14.8 | 100 | 9.3 | 30 | 14.6 | 100 | 16.4 | 100 |
| C3 | 7.1 | 20 | 4.9 | 0 | 7.2 | 10 | 12.8 | 80 |
| 5 | 12.3 | 100 | 11.0 | 30 | 13.3 | 100 | 15.5 | 100 |
| 6 | 11.8 | 80 | 7.7 | 40 | 10.0 | 90 | 14.4 | 100 |
| C4 | 6.2 | 0 | 4.4 | 0 | 8.9 | 30 | 10.5 | 40 |

The values shown in Table 2 demonstrate the high adhesive strength of laminates consisting of the addition-crosslinked silicone elastomer according to the invention (Examples 4, 5 and 6) and organic plastics and metals, for the case of press cure. As is evident from Comparative Example C3, high adhesive strength is not achieved by the presence of the component (C) alone (e.g. glycidyloxypropyltrimethoxysilane) but only in conjunction with component (B) according to the invention. As is evident from Comparative Example C4, furthermore, high adhesive strength is achieved not by the presence of the component (B) alone but only in conjunction with a component (C) according to the invention. This is evidence of a synergistic effect of the adhesion-promoting components (B) and (C) of the silicone elastomer material according to the invention.

Vulcanization Characteristics, Optical and Mechanical Properties and Compression Set of Addition-crosslinking Silicone Materials According to the Invention and not According to the Invention (Example 7 and Comparative Examples C5 and C6)

To assess the property profile of the self-adhesive silicone elastomer materials according to the invention and not according to the invention, 200.0 g of an addition-crosslinking liquid silicone elastomer material which is free of crosslinking agent, containing 71.6% by weight of diorganopolysiloxane having a viscosity of 20,000 mPa·s and 28.4% by weight of reinforcing filler, obtainable from Wacker-Chemie GmbH under the name ELASTOSIL® LR 3003/40 A, were thoroughly mixed with an amount, described in the following Examples C5, 7, and C6, of adhesion-promoting additive which simultaneously serves as crosslinking agent, degassed under a vacuum of 10 mbar, filled into a compression mold and crosslinked at a temperature of 175° C. for 10 min to give a 2 mm thick silicone elastomer film. The film was characterized with respect to transparency and mechanical properties (Shore A according to DIN 53505; elongation at break and tensile strength according to DIN 53504; resilience according to DIN 53512; tear propagation strength according to ASTM D 624 B; compression set according to DIN 35517, 22 h/175° C.). Furthermore, the crosslinking characteristics of the freshly prepared uncrosslinked silicone material was determined by vulcametry (initiation temperature; crosslinking rate; maximum torque).

Comparative Example C5

2.1 g of the adhesion-promoting additive described in Comparative Example C1 are used according to the process described above. The results are shown in Tables 3 and 4.

Example 7

2.6 g of the adhesion-promoting additive described in Example 1 are used according to the process described above. The results are shown in Tables 3 and 4.

Comparative Example C6

0.18 g of phosphonitrilic chloride, prepared according to U.S. Pat. No. 4,203,913, is added, at room temperature, with continuous stirring, to 250 g of a methylhydrogenpolysiloxane, MeSi-(—O—SiH(Me))$_n$—O—SiMe$_3$, which has terminal trimethylsilyloxy groups and, according to $^{29}$Si-NMR, has a number average chain length of n=53, and 750 g of a siloxane copolymer having terminal trimethylsilyloxy groups, consisting of dimethylsilyloxy and methylphenylsilyloxy units and having a viscosity of 100 mPa·s, measured at 25° C. After application of a vacuum of <20 mbar, stirring is carried out for 5 min and the vacuum is then broken with N$_2$ Stirring is then carried out for 2 h at a temperature of 100° C. 1.5 g of hexamethyldisilazane are added and stirring is carried out for a further 15 min. Finally, a vacuum of <10 mbar is applied, the mixture is freed from volatile components with continuous stirring for 1 h at 100° C., the vacuum is broken with N$_2$, cooling to room temperature is effected, and the reaction product is filtered. 933 g of a clear silicone oil having a viscosity of 175 mPa·s and a content of 0.39% by weight of Si-bonded hydrogen are obtained. According to the $^{29}$Si-NMR spectrum, the reaction product is a siloxane copolymer having terminal trimethylsilyloxy groups and consisting of —O—Si(Me)$_2$—, —O—SiH(Me)— and —O—Si(Me)Ph— units in a molar ratio of 25.9:36.2:37.9. The preparation of the adhesion-promoting additive which is used in an amount of 4.0 g according to the process described above is carried out by mixing 10 parts by weight of glycidyloxypropyltrimethoxysilane with 30 parts by weight of the reaction product described above. The results are shown in Tables 3 and 4.

TABLE 3

Transparency and crosslinking characteristics

| Example | Transparency | Initiation temperature [° C.] | Crosslinking rate [Nm/min] | Maximum torque [Nm] |
| --- | --- | --- | --- | --- |
| C5 | translucent | 105 | 1.09 | 0.46 |
| 7 | translucent | 114 | 0.52 | 0.36 |
| C6 | milky turbid | 103 | 0.13 | 0.19 |

The results of the measurements shown in Table 3 demonstrate the disadvantages with regard to transparency and crosslinking characteristics of comparative self-adhesive silicone elastomer materials not according to the invention, whose SiH-containing component is distinguished by higher contents of incompatible radicals (>12 mol %). In addition to increasing turbidity of the crosslinked silicone elastomer, there is also increasing inhibition of the crosslinking reaction, necessitating a limitation of the content of incompatible radicals of the component (B) to <12 mol % as in the silicone materials according to the invention.

TABLE 4

| | | Mechanical properties | | | | |
|---|---|---|---|---|---|---|
| Example | Shore A | Elongation at break [%] | Tensile strength [N/mm$^2$] | Resilience [%] | Tear propagation strength [N/mm] | Compression set [%] |
| C5 | 39 | 650 | 8.6 | 54 | 25.0 | 44 |
| 7 | 34 | 750 | 8.7 | 49 | 23.8 | 48 |
| C6 | 26 | 950 | 8.5 | 36 | 33.7 | 75 |

The values of the mechanical properties of the vulcanized products, shown in Table 4, demonstrate the considerable impairment of the crosslinking which occurs in the case of a very high content of incompatible radicals in the SiH crosslinking agent, which impairment is reflected in a low network density (low Shore A, greatly reduced resilience) and the persistence of numerous reactive groups, in particular SiH groups (high values of the compression set).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A self-adhesive addition-crosslinking silicone composition, comprising (A) diorganopolysiloxane(s) of the general formula (1)

$$R^1{}_aR^2{}_bSiO_{(4-a-b)/2} \quad (1),$$

in which
R$^1$ is a hydroxyl radical or a monovalent, optionally halogen-substituted C$_{1-20}$ hydrocarbon radical optionally containing O, N, S or P atoms and free of aliphatically unsaturated groups,
R$^2$ is a monovalent, aliphatically unsaturated, optionally halogen-substituted C$_{2-10}$ hydrocarbon radical optionally containing O, N, S or P atoms,
b has a value from 0.003 to 2,
with the proviso that 1.5<(a+b)<3.0, that on average at least two aliphatically unsaturated radicals R$^2$ are present per molecule, and that the viscosity of the diorganopolysiloxane(s) (A), determined at 25° C., is 1 mPa·s to 40,000 Pa·s;

(B) organohydrogenpolysiloxane(s) of the general formula (2)

$$R^3{}_cR^4{}_dR^5{}_eH_fSiO_{(4-c-d-2e-f)/2} \quad (2)$$

in which
R$^3$ is a monovalent aliphatically saturated C$_{1-20}$ hydrocarbon radical,
R$^4$ is (a) an optionally halogen-substituted monovalent C$_{6-15}$ hydrocarbon radical which contains at least one aromatic C$_6$-ring, or
(b) a halogen-substituted, saturated monovalent C$_{2-20}$ hydrocarbon radical optionally containing O, N, S or P atoms,
R$^5$ is a bivalent, optionally halogen-substituted C$_{6-20}$ hydrocarbon radical Si-bonded at both ends, optionally containing O, N, S or P atoms,
c, d, e and f denote positive numbers, with the proviso that the organohydrogenpolysiloxane (B) contains on average 3 to less than 20 SiH groups per molecule, that the relationship: 0.05<100 (d+e)/(c+d+e+f)<12 is fulfilled, and that the viscosity of the organohydrogenpolysiloxane (B), determined at 25° C., is 1 mPa·s to 100 Pa·s;

(C) organosilicon compound(s) having epoxy groups and hydrolyzable groups of the general formula (3)

$$R^7{}_gR^8{}_hR^9{}_iSiO_{(4-g-h-i)/2} \quad (3)$$

and/or their partial hydrolysis products, in which
R$^7$ is a hydrogen radical, a hydroxyl radical or an optionally halogen- or cyano-substituted, saturated monovalent C$_{1-20}$ hydrocarbon radical optionally containing O, N, S or P atoms,
R$^8$ is an optionally halogen-substituted monovalent C$_{2-20}$ hydrocarbon radical containing at least one epoxy group, optionally containing O, N, S or P atoms,
R$^9$ is a hydrolyzable, monovalent optionally halogen-substituted C$_{1-20}$ hydrocarbon radical bonded to Si via an Si—O—C—, Si—O—N— or Si—N— link, optionally containing O, N, S or P,
with the proviso that 4>g≧0, 4>h>0, 4>i>0, 4≧(h+i)>0 and 4≧(g+h+i); and (D) a hydrosilylation catalyst.

2. The self-adhesive addition-crosslinking silicone composition of claim 1, wherein the viscosity of the component (B) measured at 25° C., is 2 mPa·s to 1 Pa·s.

3. A process for the preparation of self-adhesive addition-crosslinked silicone elastomers, in which the self-adhesive addition crosslinking silicone compositions of claim 1 is heated to 30° C. to 250° C.

4. A process for the preparation of self-adhesive addition-crosslinked silicone elastomers, in which the self-adhesive addition-crosslinking silicone compositions of claim 2 is heated to 30° C. to 250° C.

5. A self-adhesive addition-crosslinked silicone elastomer obtained by the process of claim 3.

6. A process for bonding an addition-crosslinkable silicone composition to a substrate, in which the self-adhesive addition-crosslinkable silicone compositions of claim 1 is applied to the substrate and crosslinked by heating to 30° C. to 250° C.

7. A process for bonding an addition-crosslinkable silicone composition to a substrate, in which the self-adhesive addition-crosslinkable silicone compositions of claim 2 is applied to the substrate and crosslinked by heating to 30° C. to 250° C.

8. A composite material obtained by the process of claim 6.

9. A composite material obtained by the process of claim 7.

* * * * *